April 8, 1924.
O. D. WILLIS
1,490,054
AUTOMOBILE HEADLIGHT CONSTRUCTION
Filed Aug. 29, 1923    2 Sheets-Sheet 1
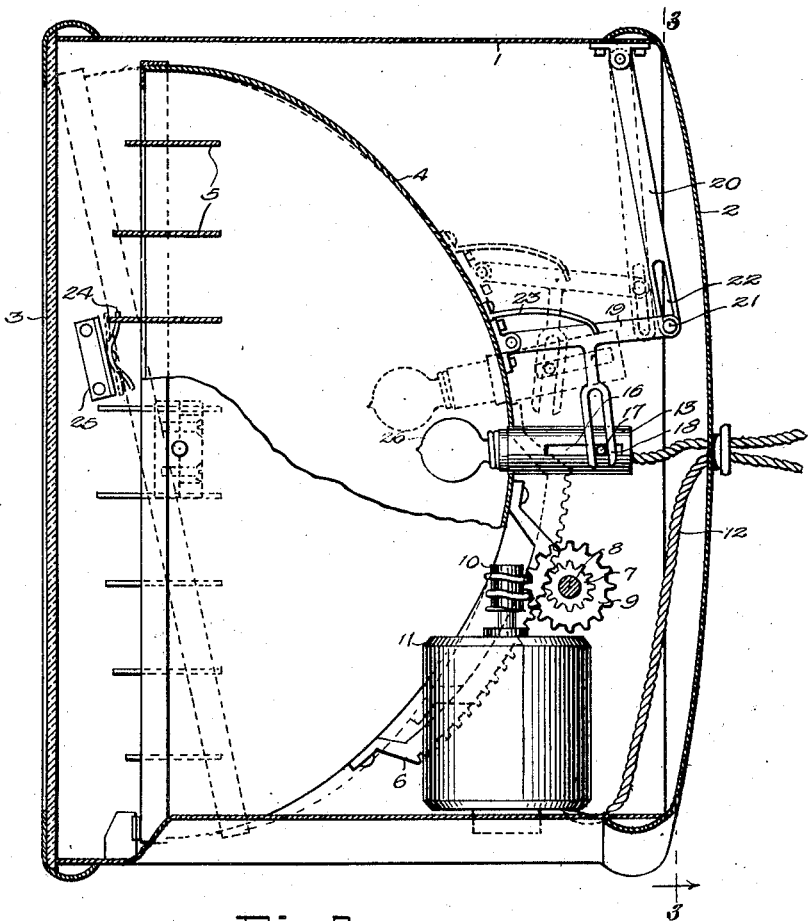
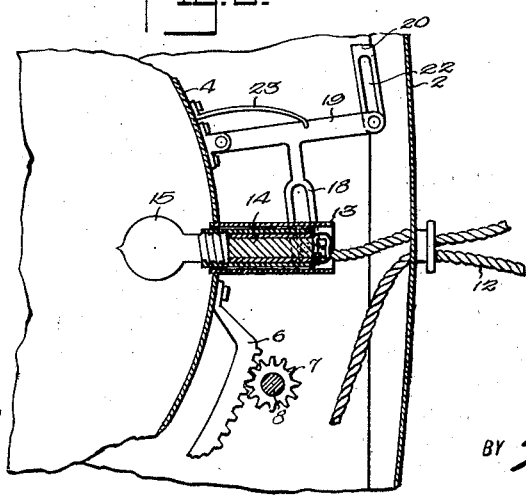
WITNESSES
INVENTOR
O. D. WILLIS
BY
ATTORNEYS

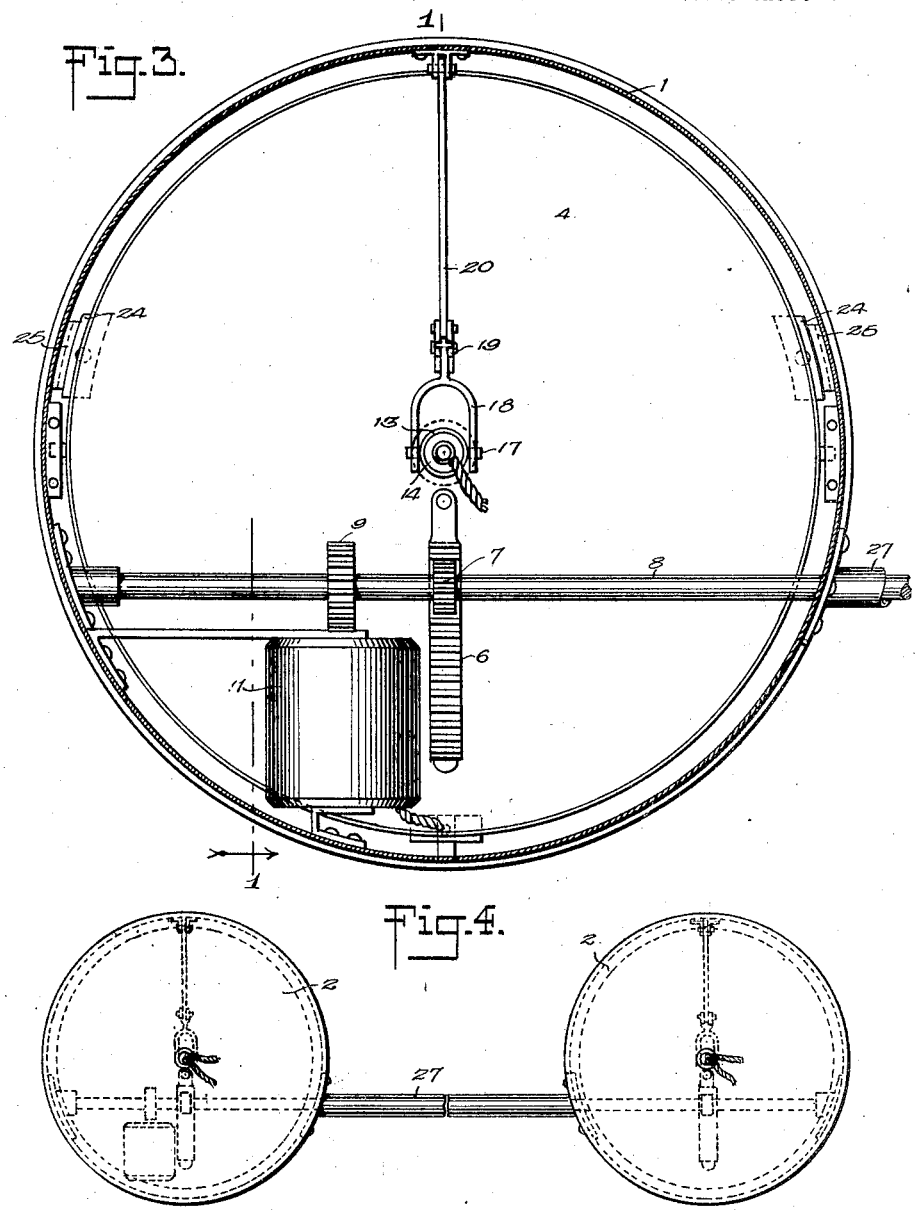

Patented Apr. 8, 1924.

1,490,054

UNITED STATES PATENT OFFICE.

OSCAR DELLMONT WILLIS, OF HUNTINGTON, WEST VIRGINIA.

AUTOMOBILE HEADLIGHT CONSTRUCTION.

Application filed August 29, 1923. Serial No. 659,980.

*To all whom it may concern:*

Be it known that I, OSCAR D. WILLIS, a citizen of the United States, and a resident of Huntington, in the county of Cabell and State of West Virginia, have invented a new and Improved Automobile Headlight Construction, of which the following is a full, clear, and exact description.

This invention relates to an automobile headlight construction, and has for an object the provision of a headlight part of which can be tilted so that in approaching other cars the light from the lamp can be deflected downwardly on the road in front of the car.

Another object concerns the provision of means whereby this operation can be effected merely by the manipulation of a switch on the steering wheel of an automobile.

A further object concerns the provision of means whereby the automatic movement of a part of the headlight to deflect the light downwardly will also put into operation mechanism whereby the focus of the lamp in the reflector will be changed.

A still further object concerns the provision of a structure whereby the apparatus is simple and rugged and liable only to a minimum extent to get out of repair and require adjustment.

The invention is illustrated in the drawings, of which—

Figure 1 is a vertical longitudinal section through the headlight;

Fig. 2 is a detail section through the part of the reflector containing the bulb and lamp socket, showing the manner in which the bulb is mounted in the reflector;

Fig. 3 is a section taken on the line 3—3 of Fig. 1; and

Fig. 4 is a rear elevation of the two headlights.

The form of the invention shown in the drawings is a preferred form, although it is understood that modifications in the construction and arrangement of the parts and in the character of the materials used may be adopted without departing from the spirit of the invention.

The invention illustrated in the drawings includes a headlight casing 1 having a rear plate 2 and a front transparent plate 3. Within the casing a reflector 4 is pivotally mounted. The front of this reflector is open and therein is mounted a series of faces 5 horizontally disposed across the front of the reflector and rigidly connected thereto to move therewith. On the rear of the reflector is mounted a rack bar 6 with a pinion 7 mounted on a shaft 8. This shaft also carries a gear 9 meshing with a worm gear 10 on the shaft of a motor 11, this motor being disposed within the casing 1. The motor is connected by a suitable wire or cable 12 to a switch on the steering wheel of an automobile. In the back of the reflector is mounted a shell 13 within which a lamp socket 14 is slidably mounted. This socket supports a lamp 15 projecting within the reflector in the usual manner. The shell 13 is provided with slots 16 and through these slots pins 17 extend from the lamp socket. These pins are engaged by brackets 18 dependent from a bar 19. This bar is hinged to the back of the reflector casing at one end and pivotally connected to the lower end of a lever or rocking arm 20 at the other end. This pivot connection is effected by the projection of a pin 21 on the bar 19 into a slot 22 on the rocking arm or lever 20. A spring 23 tends to oppose the upward movement of the bar 19.

The forward movement of the reflector casing within the lamp housing 1 to the dotted position shown in Fig. 1, is limited by the engagement with the front edge of the reflector on either side thereof, by spring members 24 mounted on suitable bracket plates 25 in the sides of the housing 1. The rocking arm 20 is hinged to the lamp housing 1.

In the operation of the device, when any suitable switch convenient to the hand of the driver is operated, the motor will be energized to move in a given direction. Assuming the parts in the position shown in Fig. 1, the movement of the motor in the proper direction will tilt the reflector forward. As this forward movement takes place, the lever system, including the bar 19, the rocking arm 20 and the brackets 18 will change their relative positions to the positions shown in dotted lines in Fig. 1 by reason of their pivotal connection and in so doing the relation of the bracket members to the shell 13 will be changed so as to cause the lamp bulb 26 to be moved forward somewhat out of focus with respect to the reflector 4 so that the light thrown downwardly on the road will be a more or less diffused light. At the same time the forward inclination of the blades or faces 5 will prevent any direct light from the lamp 26 being projected outwardly or forwardly into the eyes of an approaching driver. Therefore, it will be seen that I provide means connected to the reflector for rocking it within the casing; I provide means for slidably supporting a lamp with respect to the reflector; and I provide a rocking or movable lever system between the reflector, the lamp socket and the housing whereby the movement of the reflector will so alter the position of the lever system that its engagement with the lamp socket will move the lamp in proportion to the movement of the reflector.

It will be noticed from Fig. 4 that the shaft 8 can extend across between the two headlights and is preferably enclosed within a tubular member 27 along that part of the shaft which lies outside of the casing and extends therebetween.

What I claim is:—

1. A headlight construction which includes a pivoted reflector therein, a rack bar on said reflector, a motor connected to operate said rack bar and tilt the reflector, a lever arm hinged to said reflector, a rocking arm hinged to said casing and having a slot therein, a pin on said first-mentioned lever slidable in said slot, a shell in said reflector having slots therein, a lamp socket slidable in said shell, pins on said socket extending through said slots, and a bracket member from the first-mentioned lever engageable with said pin whereby movement of the reflector will alter the position of the levers and the bracket member to vary the position of the lamp socket with respect to the reflector.

2. A headlight construction which includes a pivoted reflector therein, a rack bar on said reflector, a motor connected to operate said rack bar and tilt the reflector, a lever arm hinged to said reflector, a rocking arm hinged to said casing and having a slot therein, a pin on said first-mentioned lever slidable in said slot, a shell in said reflector having slots therein, a lamp socket slidable in said shell, pins on said socket extending through said slots, a bracket member from the first-mentioned lever engageable with said pin whereby the movement of the reflector will alter the position of the levers and the bracket member to vary the position of the lamp socket with respect to the reflector, and a spring mounted on said reflector in engagement with the first-mentioned lever to oppose its movement from the normal position.

OSCAR DELLMONT WILLIS.